UNITED STATES PATENT OFFICE.

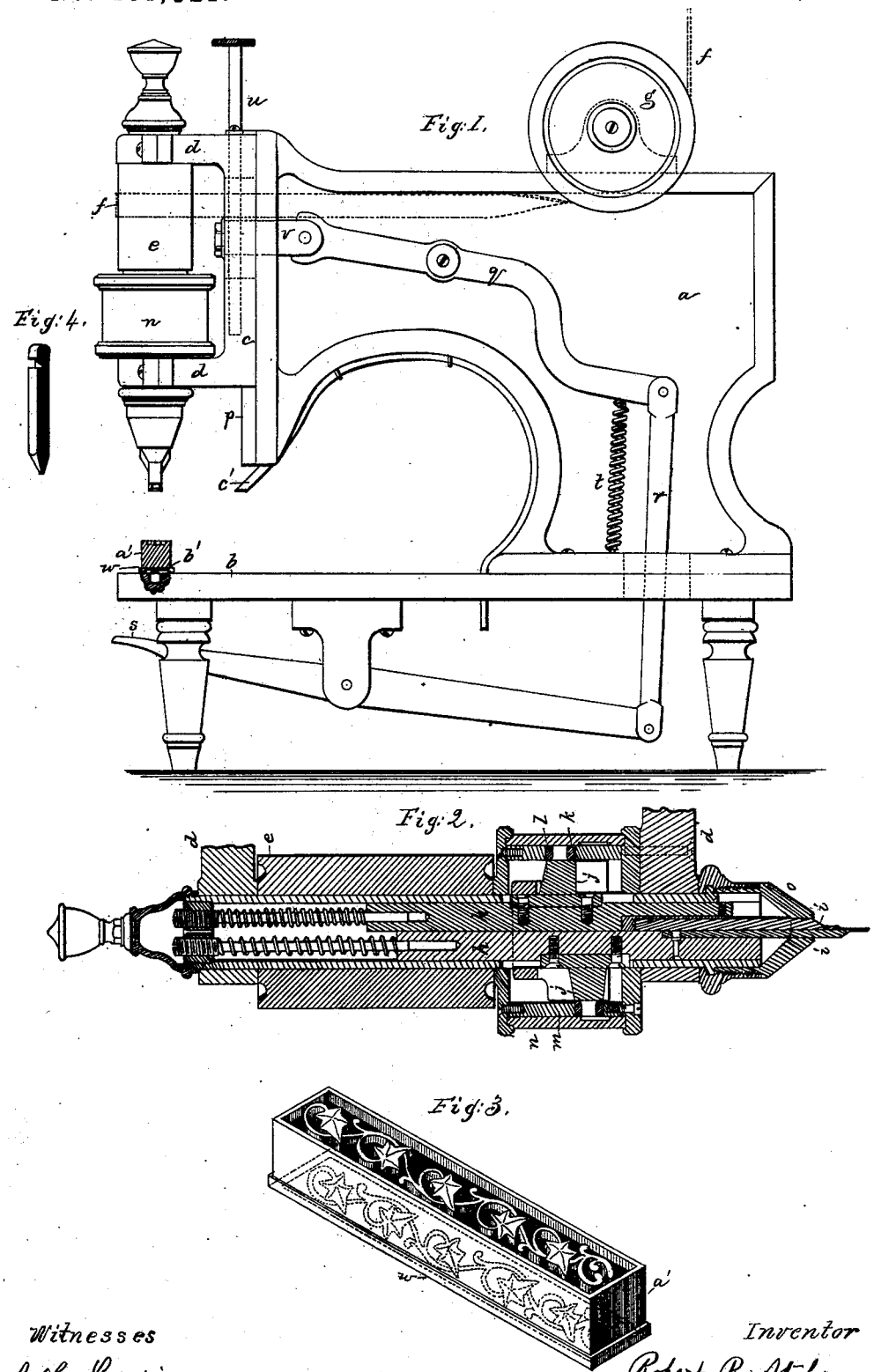

ROBERT R. ATCHISON, OF BOSTON, MASSACHUSETTS.

IMPROVEMENT IN MACHINES FOR CUTTING MARBLE, GRANITE, &c.

Specification forming part of Letters Patent No. 191,821, dated June 12, 1877; application filed April 9, 1877.

*To all whom it may concern:*

Be it known that I, ROBERT R. ATCHISON, of Boston, in the county of Suffolk and State of Massachusetts, have invented an Improvement in Machines for Cutting Marble, Granite, &c., of which the following is a specification:

This invention relates to a machine for cutting marble, granite, stone, &c., for the purposes of ornamenting or lettering the same.

Stone, marble, &c., are now commonly cut by means of hand-operated chisels, or by means of wheels.

In this invention I employ a rapidly-rotating head, in which are chisels attached to slide-rods, provided with rigid lateral arms that extend within a cam-groove, which, as the head and chisels are rotated, rapidly reciprocate the latter, causing their lower ends to strike the material with a series of sharp, quick blows, that crumble, break, or chip out the material. A blast of air employed in connection with these chisels blows away the waste and grit as fast as formed. The marble, stone, or other thing to be cut or engraved in accordance with the desired design, pattern, or letters, is marked upon its surface, in any usual way, and moved or fed under the chisels according to the exigencies of the pattern. Where a number of similar articles are to be produced, a pattern-plate is attached to the article to be cut, and it, fitted to a stud in the work-support, enables the marking upon the face of the material to be dispensed with.

Figure 1 represents in side elevation a machine constructed in accordance with this invention; Fig. 2, a vertical section taken through the head; Fig. 3, a perspective view of a block of material with an attached pattern-plate; and Fig. 4, a modified form of the tool.

The frame $a$ may be of any proper shape and size to sustain the working parts. The material—stone, marble, granite, wood, &c.—to be cut or ornamented is placed upon a suitable work-support, $b$. The slide $c$ has bearings $d$, in which rotates the head $e$, made externally as a pulley, to receive a belt, $f$, shown in dotted lines, and extended from a suitable driven pulley, the belt passing on its way the head about pulleys $g$, to change the direction of the belt.

Within the head are two slide-rods, $h$, having at their lower ends tools or chisels $i$, suitable to cut stone, marble, granite, wood, &c., such tools being removable therefrom. Projecting laterally from each bar is a rigid arm, $j$, provided, preferably, with a friction-roll, $k$, that enters a cam-groove, $l$, made in a cam-plate, $m$, within the box $n$. A nipple or nose, $o$, secured to the lower end of the head, assists in guiding and steadying the chisels or cutters.

If desired, spiral or other springs may be used within the heads, to assist in keeping the arms or their rollers always in contact with one edge of the cam-groove, so that, as the groove wears, the machine will run with less noise. The slide $c$ is attached so as to move up and down upon the forward end of the frame. The attachment between the slide and frame is made, in this instance, by means of a dovetail gib, $p$, in the frame, that enters a correspondingly-shaped groove in the slide. The slide and head are lowered to bring the tools in proper position with relation to the surface of the material to be cut by means of a lever, $q$, connected by a link, $r$, or otherwise, with a treadle, $s$, controlled by the foot of the operator.

The spring $t$ raises the slide when it is desired to lift the tools from cutting position.

The tools may be adjusted to accord with the thickness of the material by means of a screw, $u$, that enters the arm $v$, extended through a slot in the frame and into an opening in the slide. This screw turns in, but does not move longitudinally with reference to, the slide, and, entering a tapped hole in the arm $v$, it, when rotated, will move the slide and head vertically with relation to the arm $v$ and lever $q$, thereby causing the tools, when depressed by the lever and treadle, to descend more or less. As the head is rotated the arms $j$, entering the cam-shaped groove, are acted upon to raise and lower the tools quickly, so that they strike the material rapidly, and cut or remove it. The tools, having a combined reciprocating and rotating motion, strike a blow especially suited to break away, crumble, or cut out stone, marble, &c., and material of a kindred nature. By changing the position of the slide the cut into the surface may be continued to the desired depth.

The tool best adapted to marble has a semicircular end, as, for instance, as shown in Fig. 1. For granite a tool with a point, as shown in Fig. 4, has been found best. For wood, &c., the tool will be of proper shape to remove portions of the surface of the material with a clean, well-defined cut.

Where a number of articles of like pattern are to be cut, a pattern-plate, $w$, cut out to correspond with the pattern to be cut, (see dotted lines,) is attached to the under or back face of the material to be cut, as, for instance, $a'$, and the pattern-plate fitted to a guide, $b'$, in the work-support $b$, may be moved according to the pattern, to cause the tools to cut away the face of the material in accordance with such pattern.

This mechanism cuts stone, marble, and granite much more rapidly and better than usual with a hand chisel or tool. It has also been found admirable for cutting out the surface of gilt and other enameled picture-frames, and is specially adapted for carving wood.

The rigid arms are short and stiff, and lift the slide-rods positively. They may be removed, if desired to renew them. The extent of the motion of the slide bars may be governed by changing the plate containing the cam-groove.

Instead of a blast to remove chippings, &c., an exhaust may be used to draw such refuse away.

I claim—

1. The combination, with the rotating head and cam-groove, of chisels or tools and slide-rods, provided with rigid arms, extended into the cam-groove, to operate substantially as described.

2. The rotating head and tools and mechanism to reciprocate the tools, in combination with a vertically-movable slide and mechanism to lower the head into working position, substantially as described.

3. The head-carrying slide and the rotary head $c$ and its tools $i\ i$, adapted to be reciprocated, as described, in combination with the lever to move the slide and an adjusting device, $u$, to change the position of the slide with reference to the end of the arm, to govern the descent of the tools and head, according to the thickness of the material and the depth of the cut required therein.

4. The rotating head and reciprocating tools carried thereon, in combination with a support for the material and mechanism to raise and lower the head, substantially as described.

5. The rotating head and reciprocating tools, in combination with a pipe to conduct air to discharge the cuttings from the face of the material, substantially as described.

6. The rotating head and reciprocating tools, in combination with a supporting-surface and a guide and pattern-plate, to operate substantially as described.

In testimony whereof I have signed my name to this specification in the presence of two subscribing witnesses.

ROBERT RALSTON ATCHISON.

Witnesses:
G. W. GREGORY,
W. J. PRATT.